UNITED STATES PATENT OFFICE.

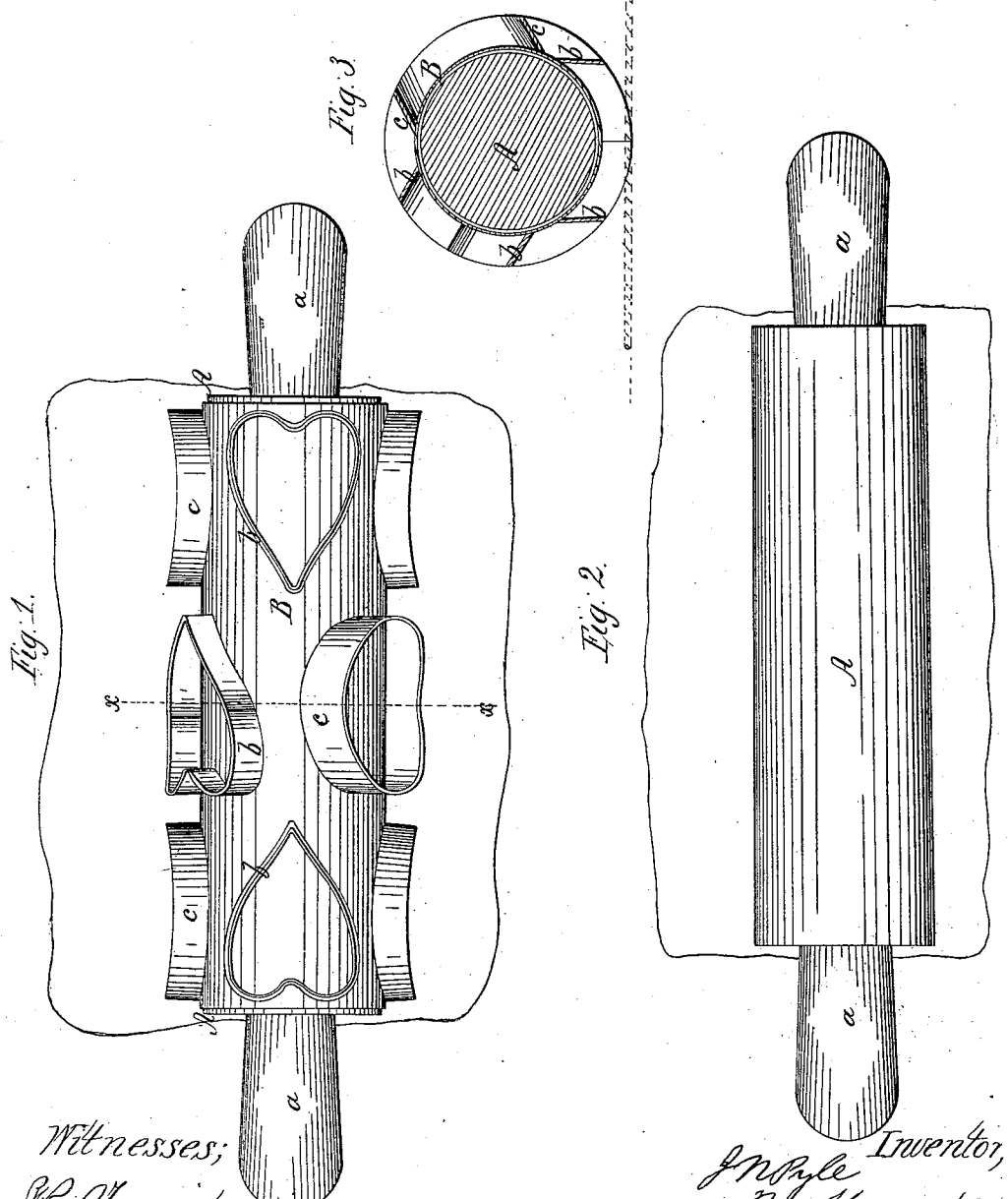

ISAAC N. PYLE, OF DECATUR, INDIANA.

CAKE-CUTTER AND ROLLING-PIN.

Specification forming part of Letters Patent No. 50,732, dated October 31, 1865.

*To all whom it may concern:*

Be it known that I, ISAAC N. PYLE, of Decatur, in the county of Adams and State of Indiana, have invented a new and Improved Combined Cake-Cutter and Rolling-Pin; and I do hereby declare that the following is a full, clear, and exact description thereof, which will enable others skilled in the art to make and use the same, reference being had to the accompanying drawings, forming part of this specification, in which—

Figure 1 represents the cake-cutter placed upon the rolling-pin and ready for cutting out the cakes. Fig. 2 represents the rolling-pin with the cake-cutter removed. Fig. 3 is a cross-section taken in the line $x\ x$, Fig. 1.

Similar letters of reference indicate like parts.

My invention consists in the combination, with an ordinary or any other suitable rolling-pin, of a cake-cutter, the latter being a case carrying any desired number of cutters of various shapes and styles, into which the roller is to be inserted when the cakes are to be cut out.

A represents the rolling-pin, which may be of any desired size or length. It may be of the ordinary kind, having its handles formed out of the same piece of wood or made separately, and rigidly secured to it; but I prefer to make the rolling-pin without handles, and insert a rod in each end, and place the handles $a\ a$ upon the rod, a hole, of course, having previously been made through them, and securing them with a nut on the end of the rods, or in any suitable way. This renders the operation of rolling more easy, as is well known.

B is the case carrying the cake-cutters. It is made of a size that will permit it to be forced over the roller, so as to envelop or partially envelop the same. Around the outside of this case are arranged the cutters $b\ c$. In the present instance the cutters are merely strips of tin soldered to the case, which have been previously been in forms to cut different-shaped cakes—for instance, a heart-shaped cutter, $b$, a round cutter, C, &c. Quite a number of them may be secured around the case and a great variety of shapes adopted.

It will be understood that the roller is to be used as an ordinary roller for rolling out dough into sheets; that it can then be rubbed off and enveloped in the case. This can then be rolled over the sheet of dough, and the cakes will be cut out quickly and accurately. The cakes so soon as cut drop out of the cutters more readily than when ordinary flat-surfaced cake-cutters are used.

It is obvious that several different cases, carrying different-shaped cutters, can be used on the same roller, and thus a very great variety of cakes may be had.

I claim as new and desire to secure by Letters Patent—

The combination of a cake-cutter with a rolling-pin, substantially as described.

ISAAC N. PYLE.

Witnesses:
 DAVID STUDABAKER,
 SAMUEL S. MICKLE.